March 14, 1967 T. MORRIS, JR 3,308,940
CLINICAL THERMOMETER DEVICE
Filed Aug. 11, 1965 2 Sheets-Sheet 1
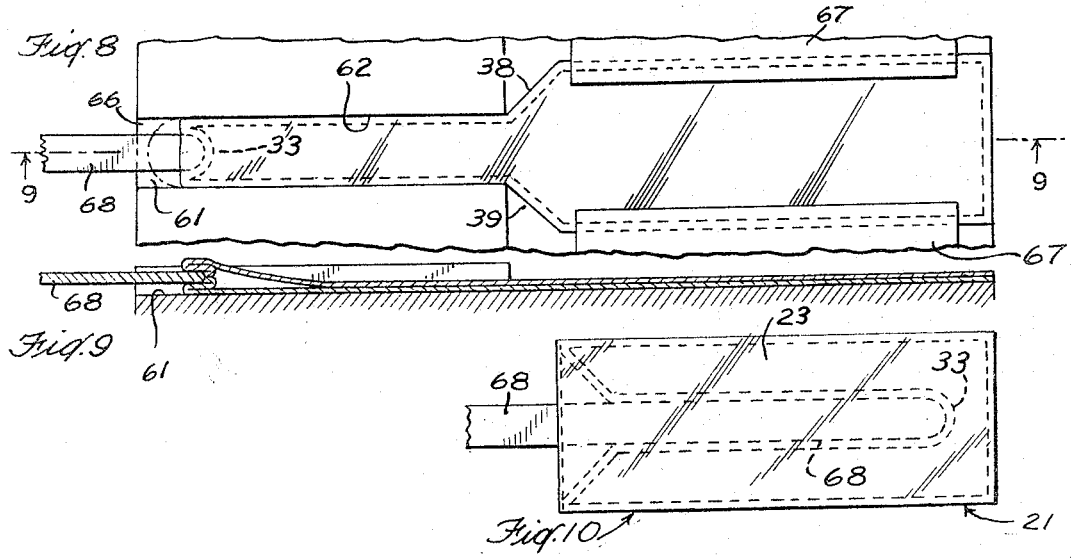
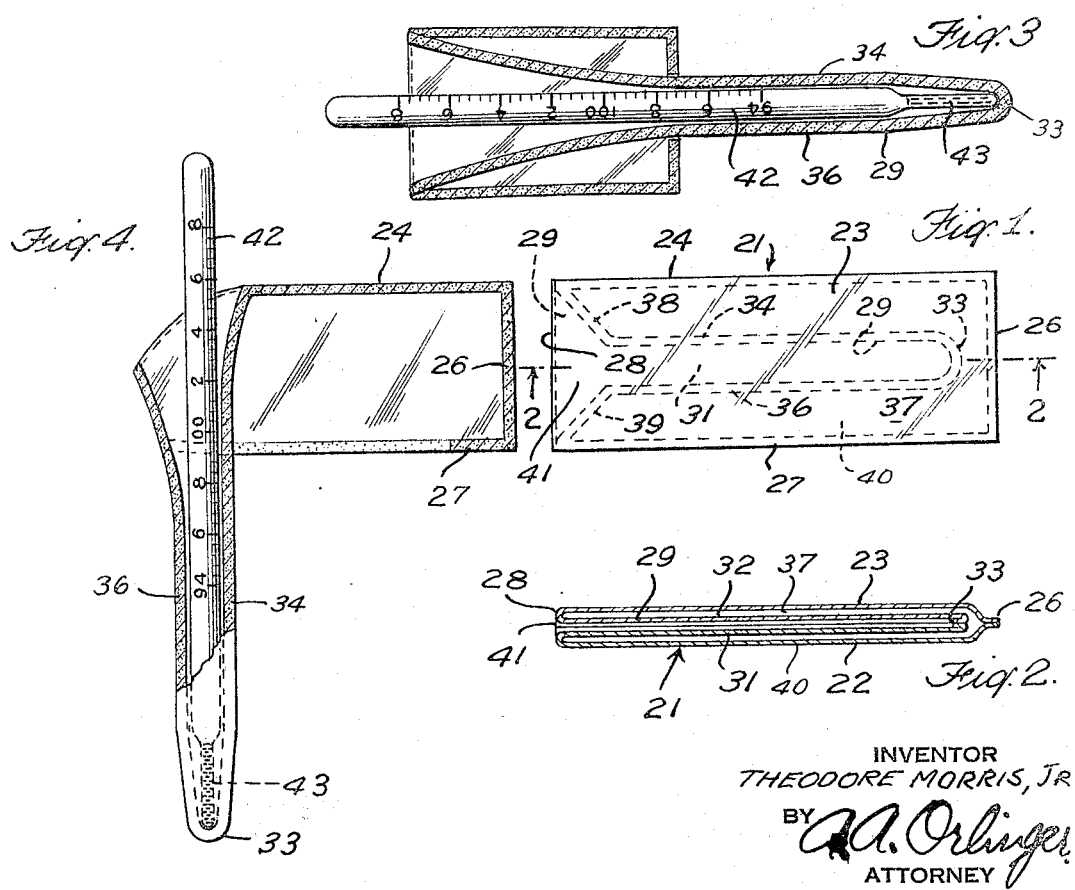
INVENTOR
THEODORE MORRIS, JR
BY
ATTORNEY March 14, 1967 T. MORRIS, JR 3,308,940
CLINICAL THERMOMETER DEVICE
Filed Aug. 11, 1965 2 Sheets-Sheet 2
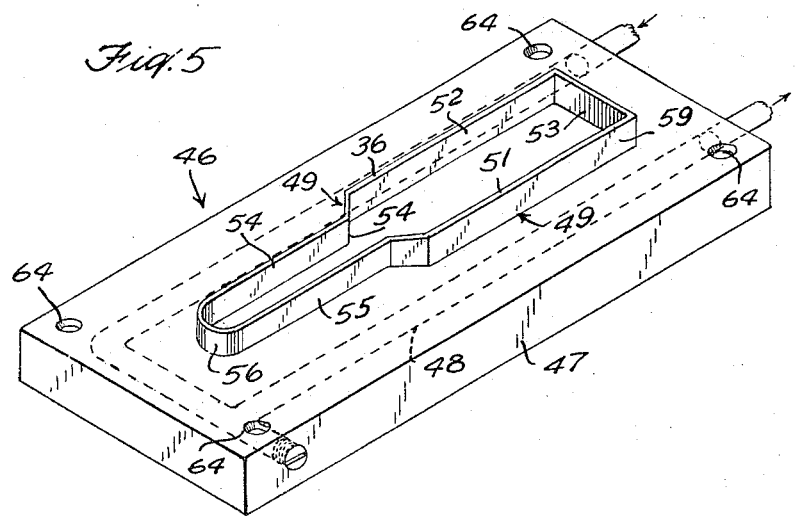
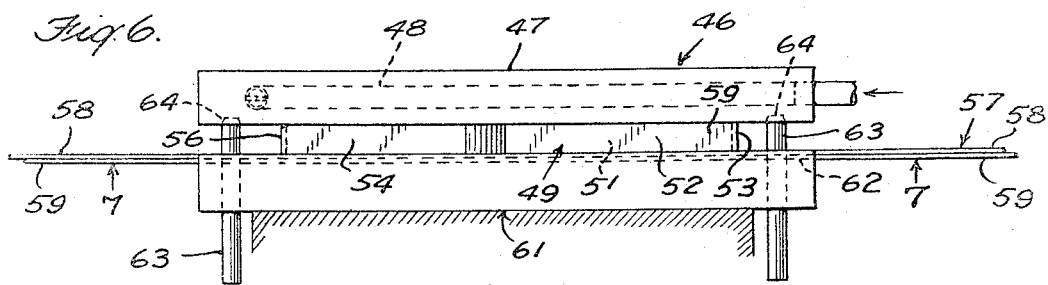
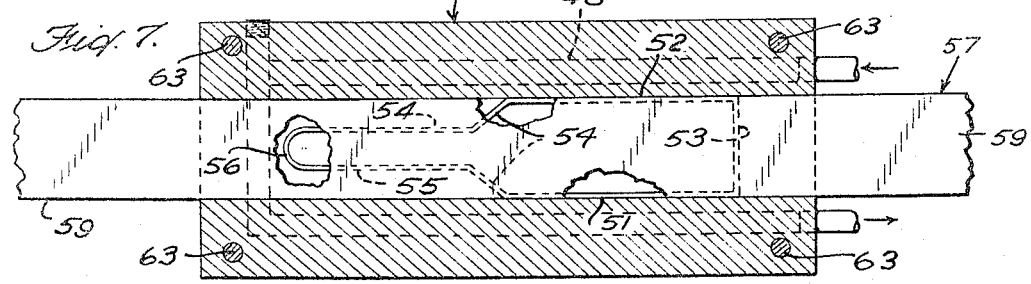
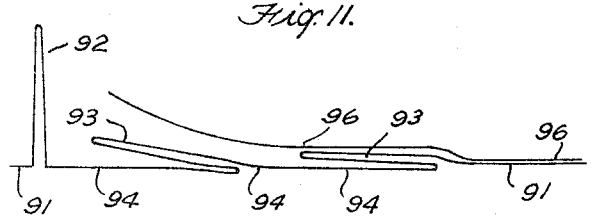
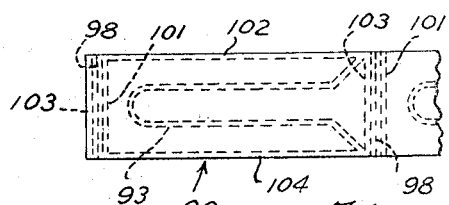
INVENTOR
THEODORE MORRIS, JR.
BY
ATTORNEY

United States Patent Office 3,308,940
Patented Mar. 14, 1967

3,308,940
CLINICAL THERMOMETER DEVICE
Theodore Morris, Jr., 1707 Undercliff Ave.,
Bronx, N.Y. 10453
Filed Aug. 11, 1965, Ser. No. 478,798
13 Claims. (Cl. 206—56)

This invention is that of an inexpensive, disposable sheath-container device of flexible material for a clinical thermometer, and so constructed as to enable readily providing over the thermometer a sterile-surfaced sheath cover, to permit safe use of the thermometer without need of preliminary disinfecting or sterilization.

In hospitals and doctors' offices, where a single thermometer may need to be used in the mouth or other body cavity of each of many patients within a short period of time, there is grave danger of cross-infection from one patient to another unless the thermometer is positively thoroughly sterilized after each use. Such positive thorough sterilization all too frequently for the purpose concerned is quite difficult to attain with regularity. Thus, while it is customary to place a thermometer in an open or partially open container holding a selected disinfecting or sterilizing liquid, it is found that often such liquid does not destroy the infectivity of a significant portion of the disease-producing organisms which may be present.

Then too, the surface of that liquid may, during the course of a day, become covered with a film in which there accumulates infectious material from the air, such as bacteria-carrying dust particles or possibly air-borne viruses. When the thermometer is withdrawn from the liquid through this film, a portion of the germ-bearing film adheres particularly over the lower part of the thermometer, and thus is introduced with the thermometer into the mouth of the next patient.

It is a feature of this invention to provide an economical, disposable and easily used protective sheath device which enables avoiding cross-infection by a clinical thermometer from one patient to another, in hospitals or doctors' offices, or in the home.

Other features of this invention will be apparent from the following detailed description and claims.

One aspect of this invention provides (i) a sealed-in protective sheath of flexible material and having interiorly a sterile surface for later exposure immediately preceding its insertion into the mouth or other body opening of the patient and (ii) an open-ended pocket for receiving the bulb and at least a major portion of a clinical thermometer. The pocket extends into the interior of the container-device and as indicated is open at one end to its exterior to enable the thermometer readily to be inserted into the pocket without any difficult manipulation or undue handling. The container-device has outer walls jacketing the pocket and being frangible by having at least one frangibly sealed edge, through which the sterile sealed inner end of the pocket may be forced out from the container jacket's sterile interior when the user pushes the thermometer merely sufficiently forcefully into the pocket to push its sealed end through such frangibly sealed edge of the jacket.

Further movement of the thermometer causes the container-device to be turned inside out for at least the most part, so that its sterile interior surface now becomes the outer surface of a relatively closely fitting sheath enclosing all of that part of the thermometer, which is to be taken into the mouth, while the surface of that sheath-container previously open to communication with the atmosphere now closely contacts the part of the thermometer ordinarily inserted for use in taking a patient's temperature. Accordingly, when a thermometer thus covered with the sterile outer-surfaced protective sheath portion of the device of this invention is inserted into the mouth or other body cavity of the user, the only surface contacting the mouth will be that sterile outer surface of that sheath.

Certain embodiments of this invention are illustrated in the accompanying drawings in which:

FIGURE 1 is a plan view of a protective-sheath-container device of this invention;

FIG. 2 is a longitudinal cross-sectional view taken along the line 2—2 of FIG. 1;

FIG. 3 is an illustration in cross-section, showing the thermometer and pocket after being forced through the frangibly-sealed end of the outer wall of the container portion of the device;

FIG. 4 is another view showing the result of forcing the pocket and thermometer out through a frangibly-sealed portion of one of the side edges of the outer wall of the container portion;

FIG. 5 (sheet 2) is an isometric view of a cutting and heat-sealing die suitable for use in one method for producing this embodiment of the devices of this invention;

FIG. 6 is a side view showing the die of FIG. 5 positioned over its companion die as used for cutting and heat-sealing a device from a pair of flexible films;

FIG. 7 is a view looking upward as taken along the line 7—7 of FIG. 6;

FIG. 8 (sheet 1) is a plan view showing the operation of inverting the elongated sheath portion of the structure of the device as produced in accordance with the method illustrated in FIGS. 6 and 7;

FIG. 9 is a longitudinal cross-sectional view taken along the line 9—9 of FIG. 8;

FIG. 10 is a plan view illustrating the completion of the inversion operation shown in FIGS. 8 and 9;

FIG. 11 (sheet 2) is a schematic view showing successive stages in still another method for producing a strip of separable container-devices of this invention; and FIG. 12 is a plan view of a portion of a strip produced by the method illustrated in FIG. 11.

Referring now to FIGS. 1 and 2 (sheet 1), the container device 21 is a substantially flat structure having generally parallel thin rectangular oblong jacket walls 22 and 23, preferably of an easily pliable, flexible plastic sheet material, joined together at three edges 24, 26 and 27 and having, extending between said walls and open at the fourth edge 28 (of the rectangular assembly), a flat pocket 29 for receiving the bulb end portion of a clinical thermometer. The pocket 29 has parallel thin walls 31 and 32 which are inwardly folded continuations of walls 22 and 23 respectively. The walls 31 and 32 of the pocket are sealed together at their rounded inner end tip 33 of the pocket 29 and at its edges 34 and 36, so that the sealed interior portion 37 of the container 21, between the pocket 29 and the outer walls 22 and 23, is sealed against contamination from the outside.

As seen in FIG. 1, tip 33 of pocket 29 is rounded while the edges 34 and 36 are parallel to each other for most of their length but diverge, as shown at 38, 39, at the mouth 41 of the pocket to facilitate insertion of the thermometer into the pocket.

The seals along the boundary edges 24, 26 and 27 of the outer walls 22 and 23 of the container-jacket are weaker than the seals at the tip portion 33 of pocket 29. This may be accomplished in any suitable manner such as by using conventional knurl heat sealing for making the seals along edges 24, 26 and 27, and then using conventional flat heat sealing around the edges of pocket 29. Instead of knurl heat sealing, other techniques such as simple knurl sealing without heat may be used to make a secure bond which will open readily when a spreading force is applied to the bond from the interior of the container-jacket.

As previously mentioned, the interior portion of the container-jacket is sealed against contamination. This interior portion 37 can be disinfected or sterilized in any suitable manner, such as by subjecting the entire sheath-container device to a sterilizing temperature as in an autoclave, or by subjecting the entire device to a sterilizing gas, such as ethylene oxide, which can penetrate through the unperforated and water-impervious material of its jacket and sheath walls.

What particular sterilizing technique to use depends on consideration of the type of material used in making the container. For example, sterilizing temperature autoclaving can be used when the container is made of a polyolefine plastic, such as isotactic polypropylene, for it is stable against the temperatures used for autoclave sterilization. Similarly, a sterilizing gas may be employed when the container is made of a material such as the conventional "high pressure" polyethylene which is permeable to such gas. Variations in these or any other suitable method, depending on conditions and cost, can be used to insure that the interior of the device is safely disinfected or sterile, for example, the electron discharge technique.

In use, a clinical thermometer 42 (FIG. 3) is inserted into pocket 29 and pushed forward (FIG. 3), or moved so as to direct sidewise (FIG. 4) its mercury bulb-receiving tip 33 of the pocket, through one of the weaker seals either at the short edge 26 or the neighboring part of one of the side sealed edges 24 and 27. Thus, as FIG. 3 shows, the mercury bulb end of the thermometer is pushed forward to force the tip of pocket 29 through the seal in the end edge 26. The user accomplishes this by holding the container-jacket in one hand, as by either or both of its edges 24 or 27, and pressing the thermometer firmly steadily forward with the other hand to force tip 33 of the pocket against and through the weaker seal at edge 26, thus splitting that seal while leaving intact the seals at the tip 33 and sides 34 and 36 of pocket 29.

By the method shown in FIG. 4, the container-jacket is held in one hand while the thermometer is inserted and manipulated in the pocket for its inner end to be directed so as to force one side of the pocket tip portion 33 against the seal, for example, at edge 27 to break that seal, but while leaving intact the seals at the tip 33 and sides 34, 36 of the pocket. In either event, the movement is continued until the sheath-container has been turned sufficiently inside out so that it's safe to use sterile surfaces, initially lining the interior portion 37 of the jacket portion 40 of the container-device 21, are on the outside while its previously outer surfaces are in contact with the thermometer.

Advantageously pocket 29 is so shaped as to conform to and fit closely the outer surface of the thermometer, particularly at its bulb portion 43. This permits excellent heat transfer between the mouth or other body cavity of the subject or patient and the thermometer so that an accurate reading of the subject's temperature can be obtained within the customarily short time. There need not be a precise fit between the thermometer and pocket 29, especially when the latter is made of thin pliable plastic, such as plastic of 0.5 to 1.5 mil thickness which folds easily so that the pocket can fit snugly against the thermometer.

One method for making the sheath-container-devices of this invention is illustrated in FIGS. 5 to 10 (sheets 1 and 2), wherein the heat-sealing and cutting die 46 comprises a block 47 of heat-conductive material having a suitable internal electric resistance heater 48 for providing the needed sealing temperature, and a raised sealing and cutting element 49 formed in the same shape as that which the container-device 21 has before its sheath portion is inverted, i.e. turned outside in to provide the pocket 29. The narrow film-contacting portion 51 of the cutting element 49 has an outer peripheral knife edge, placed contiguously outwardly of a broader heat-sealing surface.

The film-contacting portion 51 may be $\frac{3}{32}$ inch wide, of which $\frac{1}{16}$ inch may constitute the width of the inwardly contiguous heat-sealing surface. Thus, the sequentially connected walls 52, 53 and 59 of cutting element 49 will produce the outer edges 24, 26 and 27 of the container-device 21. At the same time, the walls 54, 55 and 56 will produce edges 34, 36 and tip 33 of pocket 29. For the heat seals along the edges 24, 26 and 27 to be weaker than such seal along the edges of the pocket, as discussed earlier, the heat-sealing surfaces of walls 52, 53 and 59 conveniently are knurled in a manner well known in the heat-sealing art, while the heat-sealing surfaces of the walls 54, 55 and 56 are flat.

In using die 46, a dual strip 57, i.e. comprising two superposed layers 58 and 59, of suitable thermoplastic film is placed on a base 61 (FIG. 6) having a shallow flat longitudinal depression 62 which is not much deeper than the thickness of dual strip 57 shaped to receive snugly the film-engaging portion of the die 46, which latter hot die is placed atop of the layers of film to press them into depression 62 and to cut and heat-seal them. To properly position the die 46 relative to base 61, the latter is provided with guiding pins 63 which engage in registry in corresponding recesses 64 in die 46. Depression 62 in base 61 also has an extension 66 (FIG. 8) leading to the edge at that end of base 61 from the zone where the tip 33 for pocket 29 is cut. Extension 66 provides access for insertion of an inverting tool 68 in subsequent operations.

After the cutting and heat-sealing step, cutting die 46 and any scrap film cut off during that step are removed; and the wider or jacket portion 40 of the cut shape is engaged and held by clamps 67 (FIG. 8) while a smooth round-nosed flattened rigid inverter strip 68 is applied through the extension 66 to the tip of the pocket-forming portion of the cut blank, and then is pushed against said tip as is shown in FIGS. 8 and 9 until the respective parts reach the desired respective positions shown in FIG. 10.

In a modified form of the container-device, the pocket and one of the walls of the jacket portion can be made of the thin plastic film while the other wall of the jacket can be made of a heavier plastic film (e.g. 1.5 to 25 mils thick) or of a stiffer material such as paper, glassine, and the like, to provide greater strength when desired in the overall handling of the product.

A method for producing this modification is illustrated in FIG. 11 (sheet 2). It shows schematically a sequence of steps for making an elongated strip composed of a connected continuous series of readily separable individual container-devices of this type generally shown in FIGS. 1 and 2. In this sequence a strip of the thin plastic film 91 is given an upstanding fold 92. The folded portion 92 then is pressed and cut with a hot die (not shown) to form the pocket 93 by simultaneous pressure-cutting and heat-sealing. Then the upstanding pocket is folded back onto that portion 94 (of the plastic blank 91) which is to become one of the walls of the jacket part of the container-device. A heavier sheet 96 then is knurl heat-sealed to the portion 94 to enclose the pocket 93, but to let its open end remain so. Concomitantly, the assembly is perforated along lines 98 (FIG. 12) to enable later separation of one at a time of the separable containers 99 with their pockets open on one side of the series of containers and with knurl-sealed portions 101, 102, 103 and 104 outlining each such container and sealing its jacket part. The resulting continuous series of containers can be rolled up like a bandage or a roll of paper tickets, to form a package for easy handling, and for storage or shipment.

An illustrative sheath-container device of this invention has a pocket which is about 3¼ inches long and about ¼ to ⅜ inch wide, with the container's overall length (i.e. parallel to the length of the pocket) being about 4 inches and its width being about 1 inch. The individual dimensions and shapes can be varied based on the particular dimensions and shape of the thermometer or thermometers or other clinical instrument (e.g. tongue depressor), with which the sheath-container device is to be used.

Thus, while the features of the sheath-container device of the invention have been explained by using a detailed description of an embodiment of it applicable to thermometers, other embodiments having the same combination of features can be prepared of such shape and dimensions for their use with some other clinical instrument such as tongue depressor, or the like.

Likewise, changes also can be made in the method of preparing these devices and in the means used for that. For example, instead of an electric resistance heater in the cutting and forming die, steam or heated oil can be used to provide the sealing heat. That can be done by suitable arrangement of conduits therefor in the body of the die and for connection to feed and return lines for the particular heating fluid or liquid.

Other changes can be made in various aspects of the construction of sheath-container device, such as in the arrangement for enabling the wall of the container-jacket near the closed end of the pocket to be forced or broken open to allow the pocket with the clinical instrument protected within it to be pushed out through the resulting opening to expose the outside walls of the pocket to present the protected instrument for use. One such arrangement for enabling such opening to be made in the container-jacket, near its edge 26 or the portion of edge 24 or 27 near edge 26, is to provide a series of tear perforations just inside of edge 26 or of the portion of either edge 24 or 27, by a procedure whereby the periphery of each pair of registered perforations in the superposed sheets 58 and 59 is heat sealed to close off any communication between the interior of the container-jacket with the surrounding atmosphere. Preparation of such a series of perforations is described, for example, in U.S. Patent 3,045,891 issued July 24, 1962.

Then when that end of the container-jacket is to be opened, edge 26 is torn off along the perforations if they were made just inside of it. Alternatively, the corresponding portion of either edge 24 or 27 is torn away along the perforations if the latter were made along either of these two edges, and to a sufficient distance to enable the closed end of the pocket to be pushed out through the opening and for the pocket to be continued to be pushed out for a length sufficient to permit the use of the particular clinical instrument.

In another such arrangement, either of the superposed layers 58 and 59 of the film or sheet material from which the device is to be constructed can be prepared initially so as to provide in the finished device an outside tab to be gripped from the outside and pulled along a weakened strip or band continuous with the tab) just adjacently inside of edge 26, or of the neighboring portion of either edge 24 or 27, whichever is to be made openable, so that pulling of the tab will open the container-jacket either along edge 26 or the neighboring portion of either edge 24 or 27. That then similarly will allow the closed end of the pocket to be pushed out of the resulting opening and then to be pushed out further to the extent necessary to permit use of the clinical instrument for its necessary purpose.

In still another such arrangement, a length of a sufficeintly strong thread for opening whichever of the further hereinabove described knurl or weakly heat sealed edges 26 or 24 or 27 is to be forced or broken open, can be sealed into the container just inside one of those edges, and with a short gripping length protruding out of the jacket. That can be done, for example to enable opening seal 26, by positioning such opening thread immediately prior to heat sealing of the edges so that the inner end of the thread is anchored in that end of either edge 24 or 27 which is nearer edge 26, running the thread just inside the location of edge 24 and across the end of the respective other one of edges 27 or 24 and allowing a short gripping length of the thread to hang loose outside of the container-jacket, and then heat sealing the edges as intended.

Alternatively, if instead of along edge 26, the jacket is to be opened along that portion of either of the edges 24 and 27 near edge 26, then the thread can be anchored in a part of whichever of edges 24 or 27 is to be opened and the thread then is positioned just inside of the portion of that edge so as to extend through the near end of edge 26 and to the outside; and the heat sealing is done as intended. Then for use of the enclosed clinical instrument, the protruding gripping portion of the thread is firmly gripped and pulled transversely against the inside of the edge to be opened until it is opened for a sufficient distance to enable the closed end of the pocket to be pushed through the opening and continued to be pushed through to the extent necessary for use of the instrument contained within the pocket.

Instead of rolling up any strip made up of a continuous series of a plurality of sheath-container devices, like a roll of paper tickets, which are separately individually severable from the rest of the strip, such continuous series of these devices can be formed with each succeeding device folded back over the immediately preceding one to form a rectangular pack of such number of them as may be desired, to enable tearing away a single device at a time in sequence as needed.

While the invention has been explained by detailed description of certain specific embodiments of it, it is understood that various substitutions and modifications can be made in any of them within the scope of the appended claims which are intended also to cover equivalents of the various specific embodiments.

What is claimed is:

1. A protective sheath-container device for an elongate clinical instrument to enable its insertion without previous sterilization into a body cavity without risk of transmitting infection, which container device comprises a sealed container-jacket of flexible sterilizable material and having a sterilizable interior, and extending into said interior an elongate pocket open at its outer end to the exterior of and in sealed relationship to the container-jacket for receiving through said open end and to extend into its closed end the insertion end of said instrument such as the bulb end of a clinical thermometer; and said container-jacket having a frangible part through which the closed inner end of said pocket can be pushed out from the interior of said container by applying a sufficient pushing force on said instrument to fracture said part, thereby to expose the instrument for use while sheathed within the outwardly extending exposed pocket.

2. A sheath-container device as set forth in claim 1, wherein said sterilizable interior including the outer surfaces of said pocket extending thereinto is sterilized.

3. A strip comprising a continuous series of a plurality of sheath-container devices as set forth in claim 1, the adjacent sealed edges of each pair of said containers of said strip being joined together by having a readily severable zone therebetween.

4. A sheath-container device as set forth in claim 1, wherein said pocket has a long relatively narrow inner portion of a size snugly to receive a clinical thermometer, said portion being closed at its inner end, and at its open end said pocket has a wider mouth portion tapering down to and continuous with said narrow portion.

5. A sheath-container device as set forth in claim 4, wherein the width of the outer end of said mouth portion is substantially the same as that of said sheath-container.

6. A sheath-container device of the type set forth in claim 1, said device being formed of a plurality of layers of sterilizable flexible material, a pair of said layers forming the outer walls of the jacket portion of said container device, and having extending into its interior a pocket for receiving the bulb and adjacent end portions of a clinical thermometer; said pocket opening at its outer end into said outer walls and being continuous therewith; said pocket having a sealed seam within said interior, and said outer walls having a sealed seam closing off its interior from the outside, thereby forming between the inner surfaces of said walls and outer surfaces of said pocket a sterilizable interior between them, the construction of the seams and their respective strengths being such that said sealed closing seam of the outer wall is the weaker of said seams, whereby a pushing pressure applied to the outer end of the thermometer after inserting it into said pocket can force the sealed inner portion of said pocket through said weaker seam which sealed the outer walls and yet leave the seam of said pocket intact, whereby continued movement of said pocket relative to said outer walls by continued pushing on the thermometer turns said sheath-container substantially inside out to enable presenting a sterile outside surface of the pocket covering the portion of the thermometer which is to be inserted into a body cavity.

7. A container device as set forth in claim 6, wherein said flexible material is thermoplastic and said seam of said pocket is a heat-sealed seam.

8. A sheath-container device as set forth in claim 7, wherein said flexible material is a polyolefine.

9. A sheath-container device as set forth in claim 7, wherein said flexible material is polyethylene.

10. A sheath-container as set forth in claim 7, wherein said weaker seam is a knurl seam.

11. A sheath-container as set forth in claim 7, wherein said flexible material is a film and in which a surface of said pocket is formed as an inwardly folded extension of the film of one of said outer walls.

12. A protective sheath-container device for an elongate clinical instrument to enable its insertion without previous sterilization into a body cavity without risk of transmitting infection, which container device comprises a sealed container-jacket of flexible sterilizable material and having a sterilizable interior; and extending into said interior an elongate pocket closed at its inner end to enable it to receive into its said closed end the insertion end of said instrument such as the bulb end of a clinical thermometer, said pocket being open at its other end to the exterior of the container-jacket; and said container-jacket having in the neighborhood of said closed end of said pocket a portion which can be broken open by pushing said instrument to apply pressure against said closed end of the pocket to provide an opening through which the closed inner end of said pocket can be pushed out from the interior of said container.

13. A sheath-container device as claimed in claim 12, wherein at least one wall of the jacket is made of a heavier and stronger sheet material than that of the pocket of the device.

References Cited by the Examiner

UNITED STATES PATENTS

| | | |
|---|---|---|
| 339,852 | 4/1886 | Caldwell. |
| 2,530,400 | 11/1950 | Rode. |
| 2,663,461 | 12/1953 | Brown. |
| 2,721,691 | 10/1955 | Makrauer _____ 229—55 |
| 3,190,436 | 6/1965 | Diamont _____ 206—16.5 |

THERON E. CONDON, *Primary Examiner.*

LOUIS G. MANCENE, *Examiner.*

J. M. CASKIE, *Assistant Examiner.*